L. HEIMBERG.
INHALER.
APPLICATION FILED MAR. 4, 1918.
1,278,342.
Patented Sept. 10, 1918.
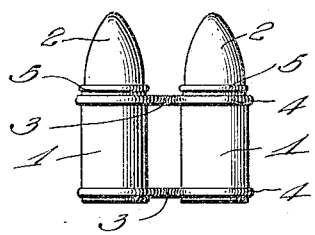
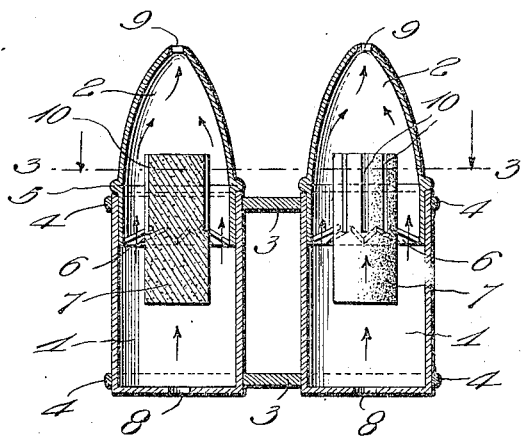
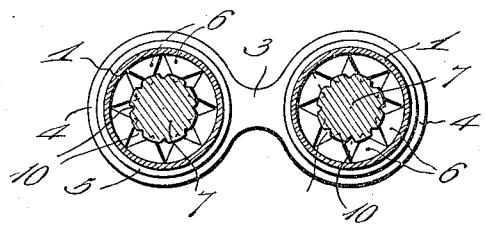
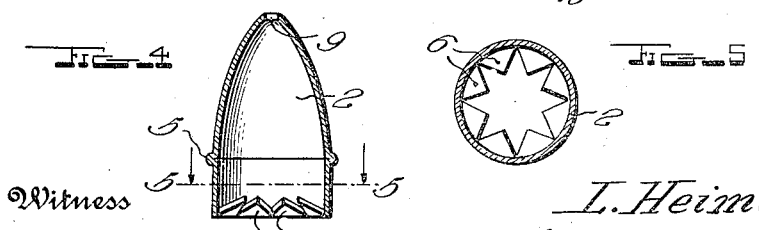
Inventor
L. Heimberg
By H. B. Willson & Co.
Attorneys
Witness

UNITED STATES PATENT OFFICE.

LEON HEIMBERG, OF BROOKLYN, NEW YORK.

INHALER.

1,278,342.  Specification of Letters Patent.  Patented Sept. 10, 1918.

Application filed March 4, 1918. Serial No. 220,344.

*To all whom it may concern:*

Be it known that I, LEON HEIMBERG, a citizen of the United States, residing at Brooklyn in the county of Kings and State of New York, have invented certain new and useful Improvements in Inhalers; and I do declare the following to be a full, clear, and exact description of the invention, such as will enable others skilled in the art to which it appertains to make and use the same.

My invention has for its object to provide a simple, compact and inexpensive, yet an efficient inhaler for administering menthol or other fumes to the nostrils, and with this general object in view, the invention resides in the novel construction herein described and claimed, and shown in the accompanying drawing wherein:

Figure 1 is a side elevation of the inhaler;

Fig. 2 is a longitudinal sectional view;

Fig. 3 is a transverse section on the plane of line 3—3 of Fig. 2;

Fig. 4 is a longitudinal sectional view of one of the casing caps; and

Fig. 5 is a transverse section on the plane of line 5—5 of Fig. 4.

In the drawing above briefly described, the numerals 1 designate a pair of parallel stamped metal casings preferably of cylindrical shape, each casing having a hollow stamped metal cap 2 fitting removably into its upper end. A pair of transverse tie plate 3 extend between the casings 1 and are provided with ring-like ends 4 through which said casings pass and in which they are sweated, electro-welded, brazed or otherwise suitably secured to hold the casings in such spaced relation as to correctly locate the caps 2 for reception in the user's nostrils, said caps being of substantially cone shape to form nose pieces.

Near their open lower ends, the caps 2 are formed with external beads 5 to limit their insertion into the casings, and said ends are notched and bent inwardly to form a plurality of preferably V-shaped ductile teeth 6 which slant upwardly to their pointed free ends as shown. These teeth are adapted to hold a stick of menthol 7 or a body of other fume disseminating medicament, and are spaced apart sufficiently to permit air to travel around the bodies 7 from aid inlet openings 8, in the lower ends of the casings 1, through air outlet openings 9 in the upper ends of the caps 2.

The bodies 7 are necessarily of slightly greater diameter than the spaces circumscribed by the teeth 6. Thus, the forcing of said bodies in place will form grooves 10 therein, but these grooves will not permit the bodies to fall, since the latter are turned sufficiently after insertion to embed the teeth 6 in them between the grooves. As the bodies 7 evaporate, the ductile teeth 6 may be bent downwardly toward horizontal positions and thus the points of said teeth are brought closer together to grip the diminished menthol sticks, or the like.

From the foregoing, it will be seen that although my invention is simple and inexpensive, it will be highly efficient and desirable. The use of such devices is too well known to herein require exposition, but it may be stated that within the scope of the invention as claimed, numerous minor changes may well be made.

I claim:—

An inhaler comprising an elongated casing having at one end a hollow cap forming a nose piece and fitting removably into said end, the inner end of said cap being open and having inwardly extending ductile teeth for holding a body of fume disseminating medicament, said teeth being spaced apart sufficiently to permit the passage of air around said body from one end of the casing to the other, said casing having an air inlet and an air outlet, the latter being formed in the outer end of said caps.

In testimony whereof I have hereunto set my hand in the presence of two subscribing witnesses.

LEON HEIMBERG.

Witnesses:
  GEORGE WM. BETZ,
  ALBERT J. MOTT.

Copies of this patent may be obtained for five cents each, by addressing the "Commissioner of Patents, Washington, D. C."